(No Model.) 2 Sheets—Sheet 1.

W. DICKS.
VELOCIPEDE FITTING.

No. 589,498. Patented Sept. 7, 1897.

WITNESSES:
Chas. F. Burkhardt
Henry L. Deck

William Dicks INVENTOR.
By Wilhelm Bonner
ATTORNEYS.

THE NORRIS PETERS CO., PHOTO-LITHO., WASHINGTON, D. C.

(No Model.) 2 Sheets—Sheet 2.

W. DICKS.
VELOCIPEDE FITTING.

No. 589,498. Patented Sept. 7, 1897.

WITNESSES:
Chas. F. Burkhardt
Henry L. Deck

William Dicks INVENTOR.
By Wilhelm Bonner
ATTORNEYS

United States Patent Office.

WILLIAM DICKS, OF BUFFALO, NEW YORK, ASSIGNOR TO THE SPAULDING MACHINE SCREW COMPANY, OF SAME PLACE.

VELOCIPEDE-FITTING.

SPECIFICATION forming part of Letters Patent No. 589,498, dated September 7, 1897.

Application filed September 16, 1896. Serial No. 606,001. (No model.)

*To all whom it may concern:*

Be it known that I, WILLIAM DICKS, a citizen of the United States, residing at Buffalo, in the county of Erie and State of New York, have invented a new and useful Improvement in Velocipede-Fittings, of which the following is a specification.

This invention relates to the connecting means employed for joining the tubular frame members of bicycles and other velocipedes to the flat-sided sheet-metal fork ends and other fittings of the machine.

The object of my invention is the production of a simple fitting or connection of the kind which affords an extensive brazing-surface and which can be readily fitted to the frame-tubes.

Figure 1:
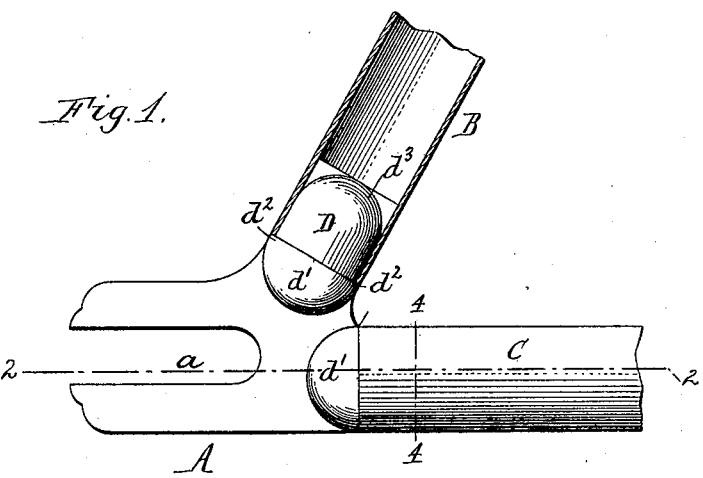
Figure 2:
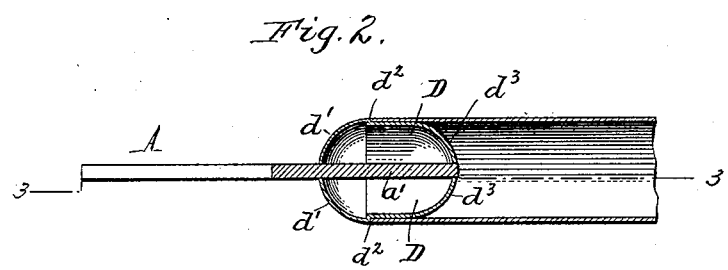
Figure 3:
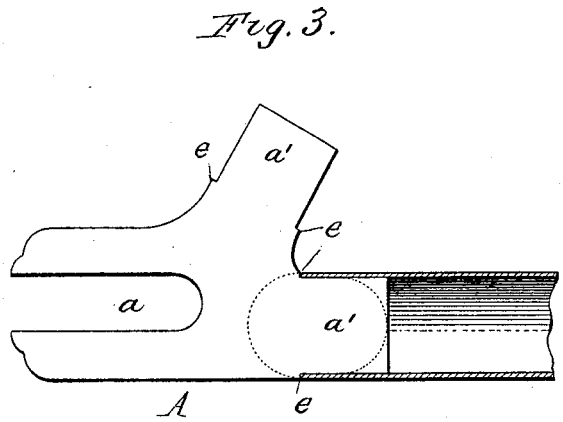
Figure 4:
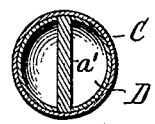
Figure 5:
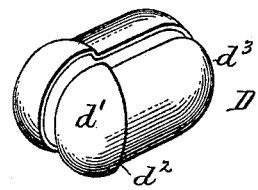
Figure 6:
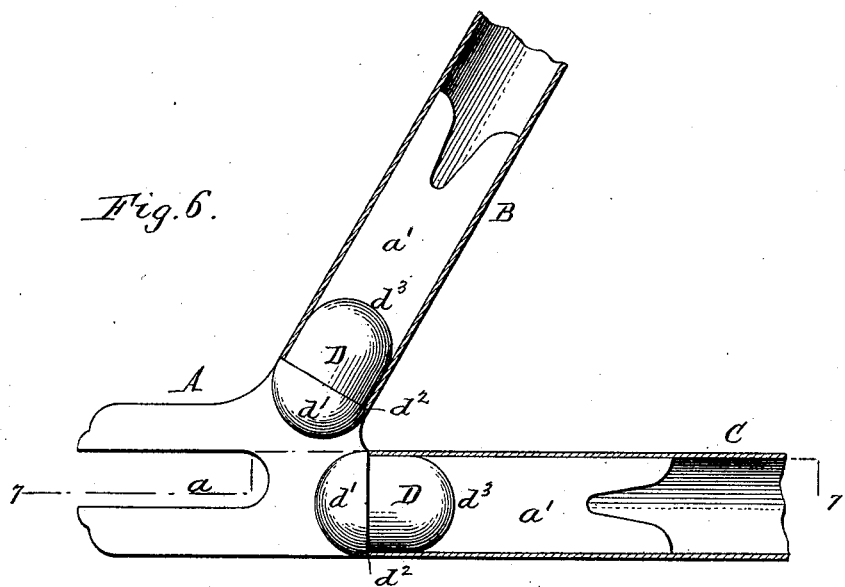
Figure 7:
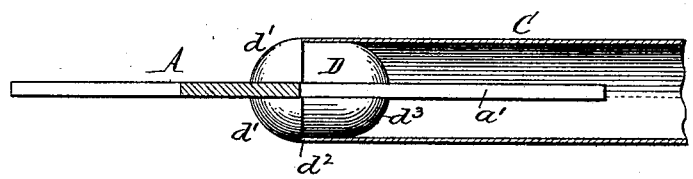

In the accompanying drawings, consisting of two sheets, Figure 1 is a side elevation, partly in section, showing the rear fork end of a bicycle and the adjacent frame-tubes united by my improved connection or fitting, one of the tubes being shown in elevation and the other in section. Fig. 2 is a horizontal section in line 2 2, Fig. 1. Fig. 3 is a vertical longitudinal section in line 3 3, Fig. 2. Fig. 4 is a cross-section in line 4 4, Fig. 1. Fig. 5 is a detached perspective view of the sectional bushing. Fig. 6 is a sectional elevation of the fork end and adjacent frame-tubes, showing a slight modification of the invention. Fig. 7 is a horizontal section in line 7 7, Fig. 6.

Like letters of reference refer to like parts in the several figures.

A is the flat-sided end or fitting of the rear fork, which is preferably stamped out of sheet metal, with the usual slot $a$ for receiving the axle of the rear wheel and the customary projections or extensions $a'$ $a'$ for the attachment of the adjacent frame-tubes B and C. Each of these tubes is connected with the corresponding extension of the fork end by a cylindrical sleeve or bushing composed of two approximately semicylindrical sections D D, which bear with their flat edges against opposite sides of the flat extension, the section being of such size that the same, together with the interposed extension $a'$, forms a cylindrical stub or lug over which the tubular frame member is fitted, as shown.

The extension of the fork end is equal in width to the internal diameter of the frame-tube, so as to fit snugly into the latter and form a flush joint with the body of the bushing-sections.

The sections of the bushing are brazed to the fork end and the frame-tube is in turn brazed to the outer surface of the divided bushing, thus affording a large brazing-surface for the tube and producing a strong union between the tube and the fork end. The latter is provided at opposite edges with shoulders or stops $e$, against which the adjacent end of the tube abuts. The heads or closed outer ends $d'$ of the bushing-sections are preferably enlarged, as shown, to form shoulders $d^2$, which bear against the end of the tube and determine the position of the sections in the tube, and these heads are flush with the outer surface of the tube and rounded, as shown, to form a neat finish.

The sections of the bushing are also closed at their inner ends by heads $d^3$, and the extension $a'$ of the fork end extends to the inner end of the divided bushing, so as to close the space between the inner ends of its sections. By this construction the spelter or solder used in brazing the parts is excluded from the interior of the bushing and compelled to flow over the outer surface of the same, where it is required. The sectional construction of the bushing enables the same to be easily fitted to the extension of the fork end and the frame-tube in case the bushing is somewhat too large when applied to the extension. In order to reduce the diameter of the bushing in such a case, it is only necessary to grind or cut off the flat edges of its sections sufficiently to produce the proper fit. This can be done in less time and at less expense than by turning off the outer surface of the bushing, which is necessary when the same is solid or made in one piece.

The divided construction of the bushing also permits the extension of the fork end to be continued or extended some distance beyond the bushing, if desired, and at the same time to bear with its narrow edges against the inner side of the tube for more effectually reinforcing the end portion of the tube, as shown in Figs. 6 and 7.

While my improvement is herein shown and described in connection with the sheet-metal end of a wheel-fork, it is equally useful for uniting frame-tubes to other flat-sided fittings of velocipedes.

I claim as my invention—

A connection or bushing for uniting a cycle-fitting with a tubular member of a cycle-frame, consisting of similar halves or sections of approximately semicylindrical form adapted to bear with their opposing flat edges against opposite sides of the cycle-fitting, each of said sections having closed rounded end portions, one of which end portions is enlarged, forming a semicircular shoulder on the outer surface of each section which extends transversely from edge to edge of the section and against which the end of a tubular cycle member is adapted to abut, substantially as set forth.

Witness my hand this 9th day of September, 1896.

WILLIAM DICKS.

Witnesses:
CARL F. GEYER,
HENRY L. DECK.